Patented Jan. 28, 1936

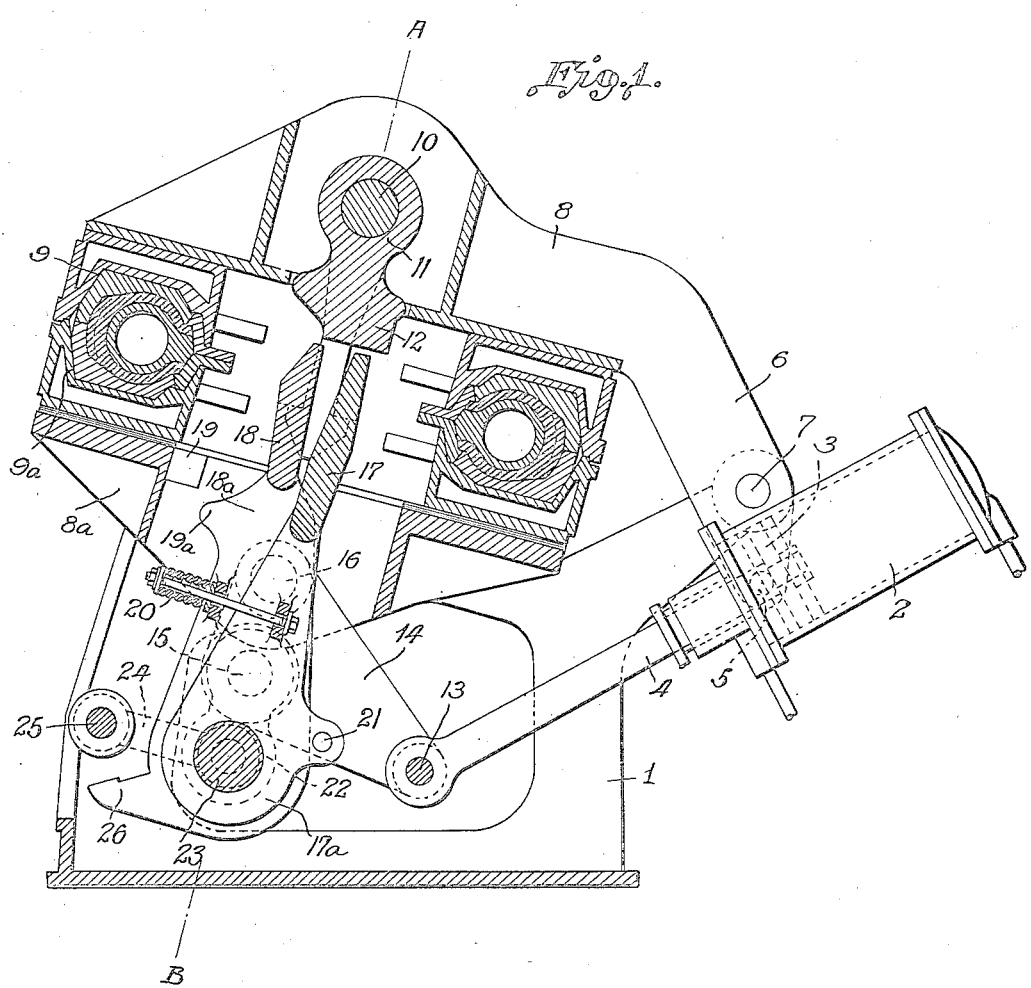

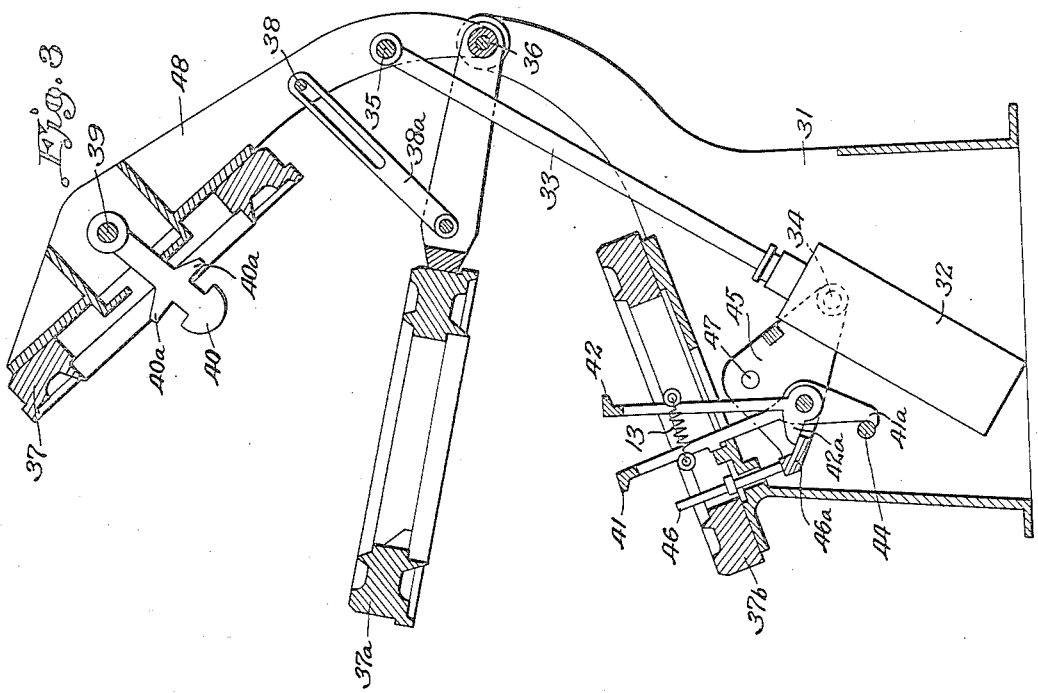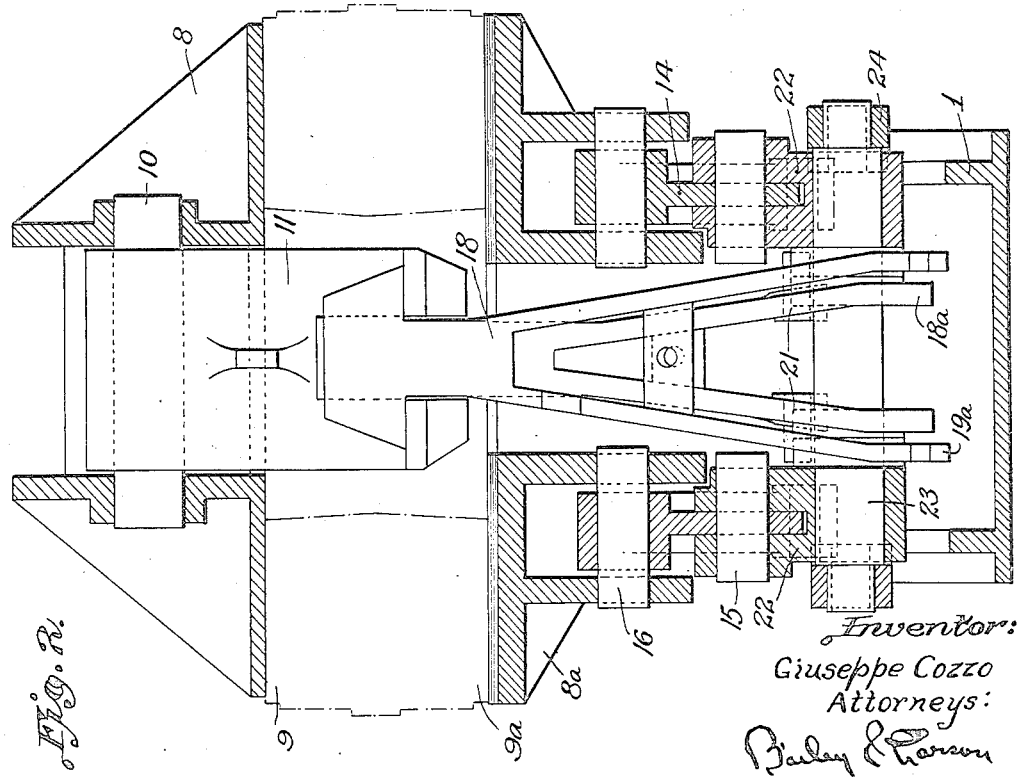

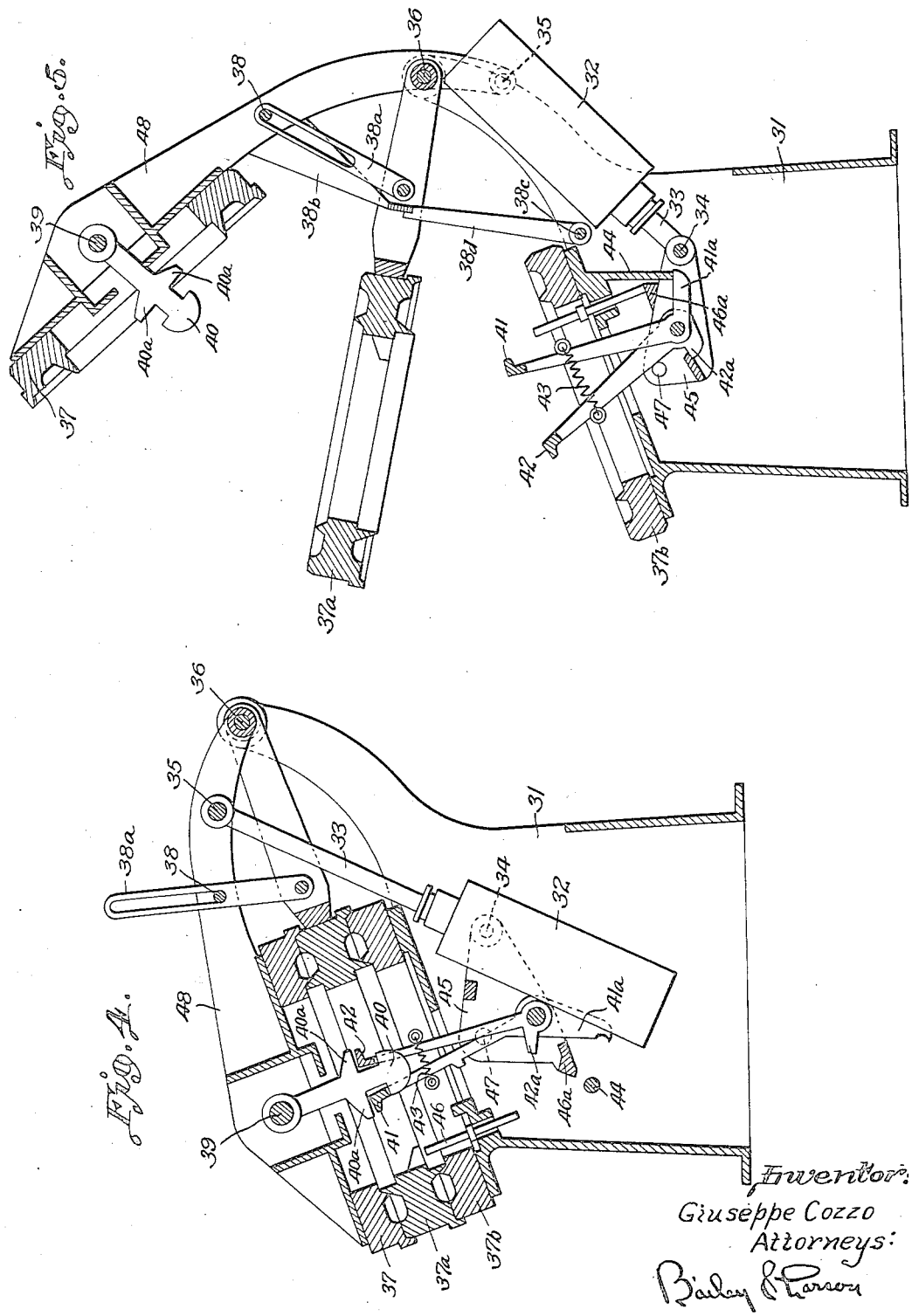

2,029,060

UNITED STATES PATENT OFFICE 2,029,060

VULCANIZING PRESS FOR PNEUMATIC TIRES, INNER TUBES, AND SIMILAR ARTICLES

Giuseppe Cozzo, Milan, Italy, assignor to Società Italiana Pirelli, Milan, Italy Application February 20, 1934, Serial No. 712,226
In Germany February 20, 1933

8 Claims. (Cl. 18—17)

The invention relates to a new type of apparatus for vulcanizing rubber articles and specially pneumatic tires and inner tubes by introducing the raw article, previously shaped, between the heated moulds of a press and maintaining same therein until vulcanized. The novelty of the apparatus is that the press is operated by means of a pressure cylinder, actuated by the pressure of water, air, steam or the like, which is hinged on a moving part of the apparatus. The consequence of this arrangement is that the piston rod as well as the cylinder itself move longitudinally to one another and operate independently two different devices of the press, which work accordingly. The cylinder may eventually also be of the known rocking type.

The piston rod acts by means of suitable operating devices, which may also be already known, on two links or hooks connected by a spring and operate their movement towards and away from each other. The cylinder operates the opening and closing of the mould in such a way that, after moving the two links or hooks apart, the press opens, the inverse occurring on moving them towards each other. The mould can of course also be operated by the piston rod and the links or hooks by the cylinder. This arrangement would however invert the position of the cylinder but not the suspension of same according to the invention. The upper half of the mould is also provided with a hook or link suspended to same so that it can, if necessary, freely oscillate, and which on closing the press enters between the two links or hooks of the other half mould and ensures the complete closing of the press.

The present invention relates to a particularly favourable method of constructing apparatus of this type and namely a vulcanizing press in which two articles can be vulcanized at the same time.

Vulcanizing press watch-case type for vulcanizing two articles at the same time are already well known, but they open on a vertical hinge so that the mould halves remain in vertical position. The employment of this type of presses offers considerable difficulties because the operator has to execute many movements and displacements to strip the vulcanized article from the press, and to substitute it with another to be vulcanized. Also the introduction of the latter is difficult owing to the vertical position of the moulds. Another disadvantage of these apparatus is offered by the presence of several pressure cylinders, at least two, for actuating the movement of the mould halves.

The invention avoids these disadvantages owing to the horizontal or nearly horizontal position given to the moulds, and to the control with single pressure cylinder, which oscillates on a moving part of the apparatus. In this way not only the displacements or movements of the operator for loading and unloading the press are reduced to a minimum, but a press of the type described in the main patent is obtained, which is remarkably simple, occupies small space, and offers favourable relations between articles vulcanized in a given time and respectively power consumption and floor space occupied.

The attached drawings show for instance three ways of executing the invention:

Fig. 1 shows the longitudinal section of the press, parallel to the cylinder.

Fig. 2 shows two sections along the lines A—B and C—D of Fig. 1.

Figs. 3 and 4 show two longitudinal sections of another press respectively in open and closed position, whereas Fig. 5 shows longitudinal section of another press in the open position.

In the press represented on Figs. 1-2 on the base 1 are situated the platens 8a and 9a as well as the hinge 7. On the latter the double arm lever 6 rotates, which is fitted at its lower end to the cylinder 2 rocking on the pin or shaft 5 whilst it is connected above with the platen 8 and with the upper half 9. The hook or link 11, provided with stop 12, is suspended to the platen 8b, on pin 10.

The piston rod 4 is connected at 13 with the toggles 14 which besides the shaft 13 have also the two shafts 15 and 16 the latter of which is on the base 1 and constitutes a fixed point. The pins or shafts 15 are connected by means of the arms 22 with the pin 23 and consequently with the hook holders 17a, 18a, which hold the hooks or links 17, 18, whilst the pin 23 is connected by means of the arms 22 also with the base 1.

The operation of the press is the following:

If it is wanted for instance to open the closed press, the pressure in the right side of the cylinder is discharged (see Fig. 1) and pressure is given to the left part. The rod 4 begins therefore to move rightwards and lifts the pin 23 and consequently also the hook-holders 17a, 18a and the hooks or links 17, 18.

The hook 11 can freely turn on pin 10. The hook or link 17, when meeting the stop 12 lifts slightly also the upper part 9 of the mould. This movement ceases when the stop 26 meets the pin 25, and, by the rotation of hook-holders on pin 23, moves the hooks or links 17, 18 away from each other stretching the spring 20. The stops 19, 19a limit the movement of the hooks or links 17, 18 away from each other.

At this point the piston stops because all the movable parts connected with it, are fixed.

The fluid pressure in the cylinder therefore determines the translation of same in the opposite direction to that of the piston.

It rocks at the same time on pin 5, and rotating link 6 on pin 7 lifts the upper half 9 of the mould.

In closing the press the same movements are repeated in inverted order.

It is understood that the press may be provided also with other devices already known, as for instance the automatically controlled valves for the distribution of the operating fluid, temperature control apparatus, automatic discharge device for the vulcanized article, etc. The press may also be modified in its details, and serve for motor-car, motor-bicycle and bicycle tires, as well as for inner tubes, vulcanizing one or two of them at each operation.

In the press represented on Figs. 3-4 the base 31 supports the lower mould half 37b and the hinge 36, on which the central parts 37a of the mould and the upper half 37 of the mould can swing.

The pressure cylinder 32 is pivoted on pin or shaft 34, whilst the piston rod 33 acts on the upper mould half 37 through the pin 35 on the arm 48. The upper half 37 of the mould is fitted with hook 40, suspended to pin 39, on which, if necessary, it can swing; hook 40 is further provided with stop 40a.

The pin 34 is placed on the plate 45, which is suspended on the base by means of pins 47 so that the lip 46a when moving comes into contact with the stop 46. The plate 45 is further fitted with the links 41, 42, connected with a spring and each of which has an extension 41a and 42a. The upper mould half 37 is further fitted with pin 38 which can move in the slot on arm 38a, connected to the central part of the mould 37a.

The press is operated as follows:

The pressure fluid is discharged from one side of the pressure cylinder, when the press is in the closed position, and it is introduced at the opposite side; the cylinder 32 thus moves and rotates the plate 45 on pin 47 before the press opens. The extension 41a of link 41 therefore meets the stop 44 so that the spring 43 is stretched and links 41, 42 open. This movement, which slightly lifts at the same time the upper mould half, ceases when the link 41 and its extension 41a are blocked by the stop 44 and when at the same time the lip 46a by means of the stem 46 lifts slightly also the central part of the mould. From this moment the piston rod 33 moves and, since links 41, 42 are already open, lifts first the upper mould half sliding pin 38 along the slot in the arm 38a and when pin 38 gets to the end, also the central part of the mould.

For closing the press the same operations are carried out with inverted order.

It is evident that the machine may be provided with also other known devices, as for instance automatic control for the valves of the pressure cylinder, automatic stripping of the vulcanized article from the mould when opening the press, etc. It is also possible to limit otherwise the rocking of the plate 45 or to place the pressure cylinder in a different position.

Another way of constructing the machine is shown in Fig. 5. The changes refer particularly to the cylinder 32 and to the lifting devices 38, 38a for the upper parts of the mould.

In this machine the pressure cylinder is suspended to the extension of the arm 48 of the upper half of the mould instead of to plate 45. The lifting device of the upper parts of the mould includes, besides the arm 38a and the pin 38, also the plate 38b fixed to the upper half of the mould, and the link 38d pivoted on pin 38c.

When the lifting movement is completed, the link 38d is in such a position that the stop at the upper end of same contacts with the plate 38b, thus avoiding that the lifted parts of the mould may shut down in case of a sudden failure of the pressure in the cylinder.

The closing of the press is obtained by rotatini first the link 38d towards the front of the machine and then actuating the cylinder as before said. These two operations may also be dependent on each other and executed by means of an automatic control, particularly by the one described above.

What I claim is:

1. A vulcanizing press or the like comprising a base, a bottom mold section supported by said base and a top mold section hinged to said base and swingable into and out of association with said top mold section, and means for locking together said mold sections, said means comprising a T shaped member attached to one of said mold sections and extending toward the other mold section and a pair of latch members anchored with respect to said other mold section, said latch members being pivotally associated with each other in scissors fashion and jointly engageable with the lateral arms of said T shaped member to clamp said T member therebetween and prevent separation of said mold sections.

2. A vulcanizing press or the like comprising a base, a bottom mold section supported by said base and a top mold section hinged to said base and swingable into and out of association with said top mold section, and means for locking together said mold sections, said means comprising a pendulous member carried by said top mold section and provided, adjacent its lower end, with a pair of opposed notches, and a pair of upstanding latch members anchored with respect to said other mold section, said latch members being pivotally associated with each other, scissors fashion, and jointly engageable with the notches of said pendulous member to prevent separation of said mold sections.

3. A vulcanizing press or the like comprising a base, a bottom mold section supported by said base, a hinge member carried by said base, a top mold section attached to said hinge member and swingable thereon into and out of association with said bottom section, means for locking said top section in closed relation with respect to its complementary lower mold section, said means comprising a pendulous member carried by said top mold section and provided, adjacent its lower end with a pair of opposed notches and a pair of upstanding latch members mounted scissors fashion upon said base and normally jointly engageable with the notches of said pendulous member to lock together said sections, and means for sequentially first disengaging said latch members from said pendulous member and thereafter bodily swinging said top mold section into open-mold position with respect to its complementary lower mold section.

4. A vulcanizing press or the like comprising a base, a bottom mold section supported by said base, a hinge member carried by said base, a top mold section attached to said hinge member and swingable thereon into and out of association with said bottom section, means for locking said top section in closed relation with respect to its complementary lower mold section, said means comprising a pendulous member carried by said top mold section and provided, adjacent its lower end with a pair of opposed notches, a pair of upstanding latch members mounted scissors fashion upon said base and normally jointly engageable with the notches of said pendulous member to lock together said sections, and means for sequentially first disengaging said latch members from said pendulous member and thereafter bodily swinging said top mold section into open-mold position with respect to its complementary lower mold section, said last mentioned means comprising a cylinder member and a piston member, one of which members is connected to said top mold section and the other of which members is connected to said hook members and effective to move said latch members relatively outwardly to disengage the ends thereof from said pendulous member.

5. A vulcanizing press or the like comprising a base, a bottom mold section supported by said base, hinge means carried by said base, a top mold section attached to said hinge means and swingable thereon into and out of alignment with said bottom mold section, scissors-type means for locking said mold sections in association, reciprocative power means for moving said mold sections to open or closed positions, and means associated with and actuated by said power means for effecting relative separation of said scissors-type locking means and disengagement thereof upon energization of said power means to effect opening of said mold sections.

6. A vulcanizing press or the like comprising a base, a bottom mold section supported by said base, a hinge member carried by said base, a top mold section attached to said hinge member and swingable thereon into and out of association with said bottom section, means for locking said top section in closed relation with respect to its complementary bottom mold section, said means comprising a pendulous member carried by said top mold section and provided, adjacent its lower end with a pair of opposed notches, a pair of upstanding latch members mounted scissors fashion upon said base and normally jointly engageable with the notches of said pendulous member to lock together said sections, spring means urging said latch members towards each other, and means for sequentially first disengaging said latch members from said pendulous member and thereafter bodily swinging said top mold section into open-mold position with respect to its complementary bottom mold section.

7. A vulcanizing press or the like for simultaneously processing a plurality of objects, comprising a base, a bottom mold section supported by said base, hinge means carried by said base, a top mold section attached to said hinge means and swingable thereon into and out of alignment with said mold section, an intermediate mold section attached to said hinge member and swingable independent of said top section, into association with said bottom section, and means for locking together said top and bottom mold sections, said means comprising a pendulous member carried by said top mold section, said pendulous member having adjacent its lower end a pair of opposed notches therein, and a pair of upstanding latch members anchored with respect to said other mold section, said latch members being pivotally associated with each other, scissors fashion, and jointly engageable with the notches of said pendulous member to prevent separation of said mold sections.

8. A vulcanizing press or the like for simultaneously processing a plurality of objects, comprising a base, a bottom mold section supported by said base, hinge means carried by said base, a top mold section attached to said hinge means and swingable thereon into and out of alignment with said mold section, an intermediate mold section attached to said hinge member and swingable independent of said top section, into association with said bottom section, and means for locking together said top and bottom mold sections, said means comprising a pendulous member carried by said top mold section, said pendulous member having adjacent its lower end a pair of opposed notches therein, and a pair of upstanding latch members anchored with respect to said other mold section, said latch members being pivotally associated with each other, scissors fashion, and jointly engageable with the notches of said pendulous member to prevent separation of said mold sections and spring means normally urging said latch members towards each other.

GIUSEPPE COZZO.